US 12,552,050 B1

(12) United States Patent
Bedard et al.

(10) Patent No.: US 12,552,050 B1
(45) Date of Patent: Feb. 17, 2026

(54) UNIDIRECTIONAL VALVE FOR SUCTION-BASED END EFFECTOR OF ROBOTIC ARM

(71) Applicant: Amazon Technologies, Inc., Seattle, WA (US)

(72) Inventors: Benjamin Bedard, Revere, MA (US); Aaron Size, Waltham, MA (US)

(73) Assignee: Amazon Technologies, Inc., Seattle, WA (US)

( * ) Notice: Subject to any disclaimer, the term of this patent is extended or adjusted under 35 U.S.C. 154(b) by 980 days.

(21) Appl. No.: 17/695,583

(22) Filed: Mar. 15, 2022

(51) Int. Cl.
 *B25J 15/06* (2006.01)
(52) U.S. Cl.
 CPC .................. *B25J 15/0625* (2013.01)
(58) Field of Classification Search
 CPC ............. B25J 15/0616; B25J 15/0625
 See application file for complete search history.

(56) References Cited

U.S. PATENT DOCUMENTS

| | | | | |
|---|---|---|---|---|
| 5,344,202 A * | 9/1994 | Ramler | .................. | B65G 47/91 294/188 |
| 7,648,182 B2 * | 1/2010 | Salimkhan | ............. | B65G 47/91 294/2 |
| 9,937,628 B2 * | 4/2018 | Werner | .................. | B25J 13/086 |
| 10,611,037 B1 * | 4/2020 | Polido | .................. | B25J 15/0061 |
| 10,821,611 B1 * | 11/2020 | DeFant | ................ | B25J 15/0625 |
| 2004/0094979 A1 * | 5/2004 | Damhuis | .............. | B25J 15/0616 294/65 |
| 2011/0254298 A1 * | 10/2011 | Lomerson, Jr. | ....... | B25J 15/0616 294/188 |
| 2014/0037413 A1 * | 2/2014 | Takashima | ........... | B25J 15/0616 279/3 |
| 2021/0178579 A1 * | 6/2021 | Saunders | ................. | B25J 19/02 |

OTHER PUBLICATIONS

U.S. Appl. No. 16/378,151, U.S. Patent Application, "Multi-Zone End Effector", filed Apr. 8, 2019.
U.S. Appl. No. 16/874,211, U.S. Patent Application, "Concentric Suction Cup Tools With Parallel Pistons" filed May 14, 2020.

\* cited by examiner

*Primary Examiner* — Shaun R Hurley
(74) *Attorney, Agent, or Firm* — Kilpatrick Townsend & Stockton LLP

(57) ABSTRACT

A robotic system can include or be coupled with an end effector assembly. The end effector may include multiple of suction cups configured to individually receive suction pressure (e.g., from a shared vacuum source), and a set of unidirectional valves coupled to the multiple suction cups to individually control supply or cut-off of the suction pressure to an individual suction cup of the plurality of suction cups. Each of the unidirectional valves may include a first flow path to convey the suction pressure from the source of suction pressure to the suction cup, and a second flow path extending between a suction cup to the atmosphere. The valve can be configured to switch between the first flow path and the second flow path to activate or deactivate the individual suction cup.

19 Claims, 13 Drawing Sheets

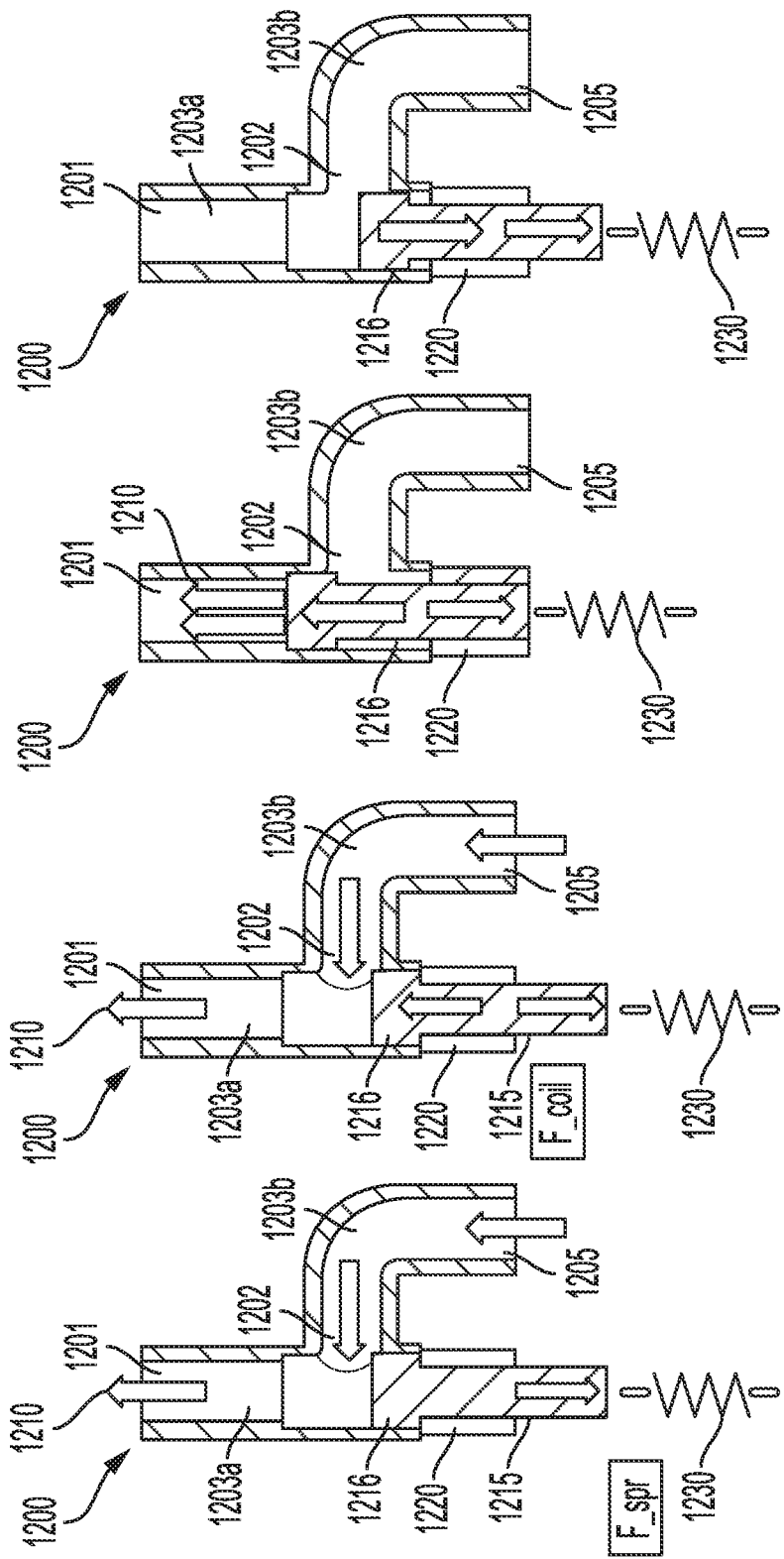

UNIDIRECTIONAL VALVE FOR SUCTION-BASED END EFFECTOR OF ROBOTIC ARM

BACKGROUND

In material-handling facilities, various items, articles, products, or packages may be organized for shipment to other locations or received as returned items. Robotic devices may be used in various areas in these facilities in order to process packages and/or other suitable items. For example, robotic devices may move items at different stages or locations, such as at or among different stations within a material-handling facility. Robotic devices can employ the use of end effectors to manipulate items. An end effector may correspond to a tool that may be connected to an end of a robotic arm and that may be suitable for manipulating items. For example, some end effectors have suction cups capable of applying a vacuum or suction force on an item. The vacuum force may draw the item to the suction cups. By applying the vacuum or suction force, the end effector can pick up the item, e.g., to facilitate moving the item to another location.

BRIEF DESCRIPTION OF THE DRAWINGS

Various embodiments in accordance with the present disclosure will be described with reference to the drawings, in which:

FIG. 13 shows a cross-section view of an example of an open state of a unidirectional valve that includes an electromagnetic coil for actuating a piston in accordance with various embodiments;

FIG. 14 shows an example of an intermediate state during closing of the unidirectional valve of FIG. 13 in accordance with various embodiments;

FIG. 15 shows an example of a closed state of the unidirectional valve of FIG. 13 in accordance with various embodiments;

FIG. 16 shows an example of an intermediate state during opening of the unidirectional valve of FIG. 13 in accordance with various embodiments;

DETAILED DESCRIPTION

Figure 1:
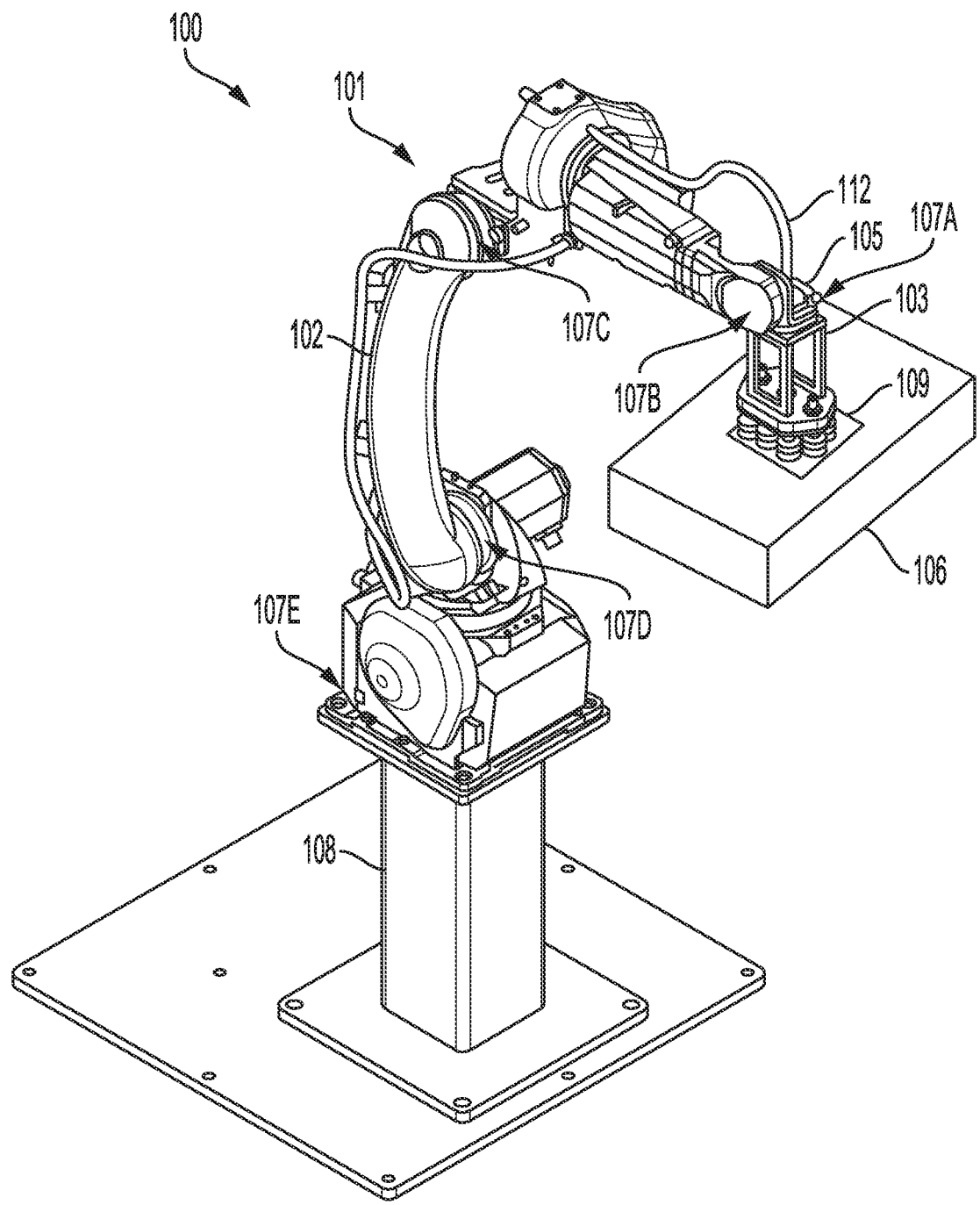
FIG. 1 illustrates a perspective view of a robotic system in accordance with various embodiments.

Various embodiments described herein are directed to systems or techniques relating to handling packages or other items using robotic arms. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

A robotic arm may include a suction-based end-of-arm-tool (EOAT) configured to pick up a package or other item. For example, the EOAT may include an end effector with multiple suction cups. In some instances, it may be useful to close suction cups that are exhibiting vacuum leakage to atmosphere (e.g., due to incomplete engagement with a targeted item). Such closure may mitigate against pressure drop and allow suction force to be focused at active suction cups, which may facilitate greater ease or ability to pick up the item.

Although solenoid valves may be employed to provide such closure, such components may be relatively heavy and/or complex in a manner that may accordingly negatively performance or capacity of the robotic arm. For example, as multiple solenoid valves may be employed (e.g., one for each suction cup), a total weight of the solenoid valves can exceed a relevant threshold, such as 5 kg (e.g., for 8 valves, each weighing approximately 630 g). In addition, a mounting bracket to mount the valves and other components may also contribute to a weight load on the EOAT.

However, there may be limitations to a total weight of components that can be located at the end effector of the robot arm. Such limitations may be present since such component weight may reduce a payload carrying capacity by a substantial amount (e.g., if robotic arm can hoist 25 kg total, the presence of 5 kg of components at the EOAT may correspond to a reduction in a payload carrying capacity by at least 20%).

In view of such impact on payload capacity, in some arrangements, valves may be relocated at a distant joint of the robotic arm located away from the end effector. However, locating the valves at the distant joint can increase the complexity of the pickup system. For example, such arrangements may rely on a multi-channel rotary union and/or other components to successfully route over the distance between the distant joint and the EOAT. In addition, a flow rate of suction available to pick up packages may be decreased because of restrictions from the rotary union and/or small tubes used to covey the suction pressure to the end effector.

In addition, valves for such arrangements may typically be bi-directional and contribute other issues of weight and/or complexity. Such bi-directional valves may allow fluid flow in two directions (such as forward through the valve or backward through the valve). To facilitate control of flow therethrough in either direction, a bi-directional valve may be actuatable in two directions. For example, bi-directional valves may open by application of positive pressure in one direction to components therein and may close by application of positive pressure in another direction to the same or other components therein. This can make the bi-directional valves bulky with a number of components and functions that may not be utilized during handling of packages or other items. As such improved valve design may be of value.

Various examples herein include valves that facilitate (a) closing the valves while the vacuum or suction is ON and (b) opening the valves when the vacuum or suction is terminated or OFF. Such valves can be unidirectional. For example, the valves may be unidirectional valves that may be arranged to allow suction pressure to flow along a path in only one direction. The valves may be unidirectional valves that may be actuatable in a single direction, e.g., in response to one or more parts of the valve being subjected to application or removal of a positive pressure (e.g., a positive pneumatic pressure) in one direction. In some instances, actuation in a single direction may be supplemented with springs or other biasing mechanisms to facilitate movement in a direction opposite actuation when actuation force is removed or ceased, yet may still be simpler and/or lighter compared to arrangements suitable for bi-directional actuation. The closing and opening mechanism of the valve may facilitate lighter, more compact, and/or less restrictive valve construction than heavier, more complex, and/or more restrictive construction that may be involved with bi-directional valves, solenoid valves, or other types of valves that may be implemented in package-handling robots. In various embodiments herein, valves can be deployed at the end effector rather than at a joint away from the distal-most end of the robotic arm. Compared to other arrangements, examples herein additionally or alternatively may facilitate simpler package handling systems employed by the robotic arm, which may provide cost and/or energy savings.

In some embodiments, an end effector assembly may include a set of unidirectional valves coupled to multiple suction cups. The suction cups can individually or respectively receive suction pressure through an individual or respective unidirectional valve. Accordingly, the unidirectional valves can individually control supply or cut-off of a suction pressure to an individual suction cup of the multiple suction cups. The unidirectional valve may be open in a ready or default state to permit supply therethrough of suction pressure to the individual suction cup, and may be selectively closeable based on a selected suction cup of the suction cups to be deactivated. The set of valves and connected suction cups can be arranged in a rectangular array, circular manner, or other configuration on the end effector assembly to pick up packages of different shapes and sizes.

In some embodiments, the multiple suction cups can receive the suction pressure from a shared vacuum source. For example, the vacuum source may be located away from the distal-most end of the robotic arm and the suction pressure may be conveyed to the suction cups through a single or multiple hoses. In some embodiments, the end effector assembly may include a hub with branched flow conduits for conveying suction pressure from the vacuum source along individual flow paths leading to each of the suction cups.

In some embodiments, the unidirectional valve body may include a first port to receive the suction pressure, a second port to couple with a suction cup of the plurality of suction cups, a discharge port open to atmosphere, and a first flow path extending between the first port and the second port. The first flow path may include an orifice that may be exposed or obstructed to open or close the first flow path.

In some embodiments, a movable piston may be disposed in the valve body to open or close the orifice along the first flow path. The movable piston may include a restriction member to block the orifice. The movable piston can also be coupled to a positive pressure receiving port to receive a positive pressure to drive the restriction member away from the orifice to open the first flow path or toward the orifice to close the first flow path.

In some embodiments, the valve body may also include a second flow path extending between a suction cup to the atmosphere. The second flow path may be shorter in length than the first flow path. The second flow path may advantageously provide quick access to atmospheric pressure when suction pressure is removed and may facilitate a faster package drop compared to valves lacking access to atmosphere.

In some embodiments, the set of unidirectional valves is configured to switch between the first flow path and the second flow path to activate or deactivate the individual suction cup of the plurality of suction cups. For example, the positive pressure may be received to drive the restriction member away from the orifice to open the first flow path while closing the second flow path, e.g., thereby activating the individual suction cup. Upon removing the positive pressure, the restriction member may be driven toward the orifice to close the first flow path while opening the second flow path, e.g., thereby deactivating the individual suction cup.

FIG. 1 illustrates an example with a robotic system 100 that includes a robotic device 101 coupled with an end effector assembly 103. The robotic device 101 may include a robotic arm 102 with the end effector assembly 103 attached to the end of the robotic arm 102. For example, the end effector assembly 103 may be attached at a distal-most end 105 of the robotic arm 102. The end effector assembly 103 can be manipulated or oriented by the distal-most joint 107A. The robotic arm 102 is also depicted in FIG. 1 with additional joints 107B-107E, such as may be included in a 5-axis or more robotic device, although any other suitable number of two or more total joints 107 (e.g., 107A, 107B, 107C, 107D, 107E or more or fewer) may be utilized. The additional joints 107B-107E may be examples of remote joints relative to the distal-most joint 107A. In use, the joints 107 may be capable of facilitating movement of the robotic arm 102 for positioning the distal-most joint 105 at a suitable position for operation of the end effector assembly 103.

The end effector assembly 103 can be configured to apply a suction pressure to pick up a package or item 106. The robotic device 101 can then move the end effector assembly 103 and the item 106 from a first location to a second location. The robotic device 101 may be situated on a riser 108 or other mounting structures as needed. Additionally, the end effector assembly 103 may be configured to apply suction pressure to a particular location on the item 106. In some embodiments, the item 106 may include a label 109.

As such, the end effector assembly 103 may be configured to apply suction pressure outside the label 109, at a center of the label 109, or other locations. In some embodiments, the particular locations at which suction pressure may be applied may depend on the size of the item 106.

The end effector assembly 103 may include a plurality of suction cups (e.g., cups 160) to apply suction pressure at a desired location on the item 106. In some embodiments, the end effector assembly 103 can be coupled to one or more hoses 112 to supply suction pressure to the plurality of suction cups (e.g., 160) through a valve bank coupled to the end effector assembly 103, e.g., as discussed in more detail below.

Figure 2:
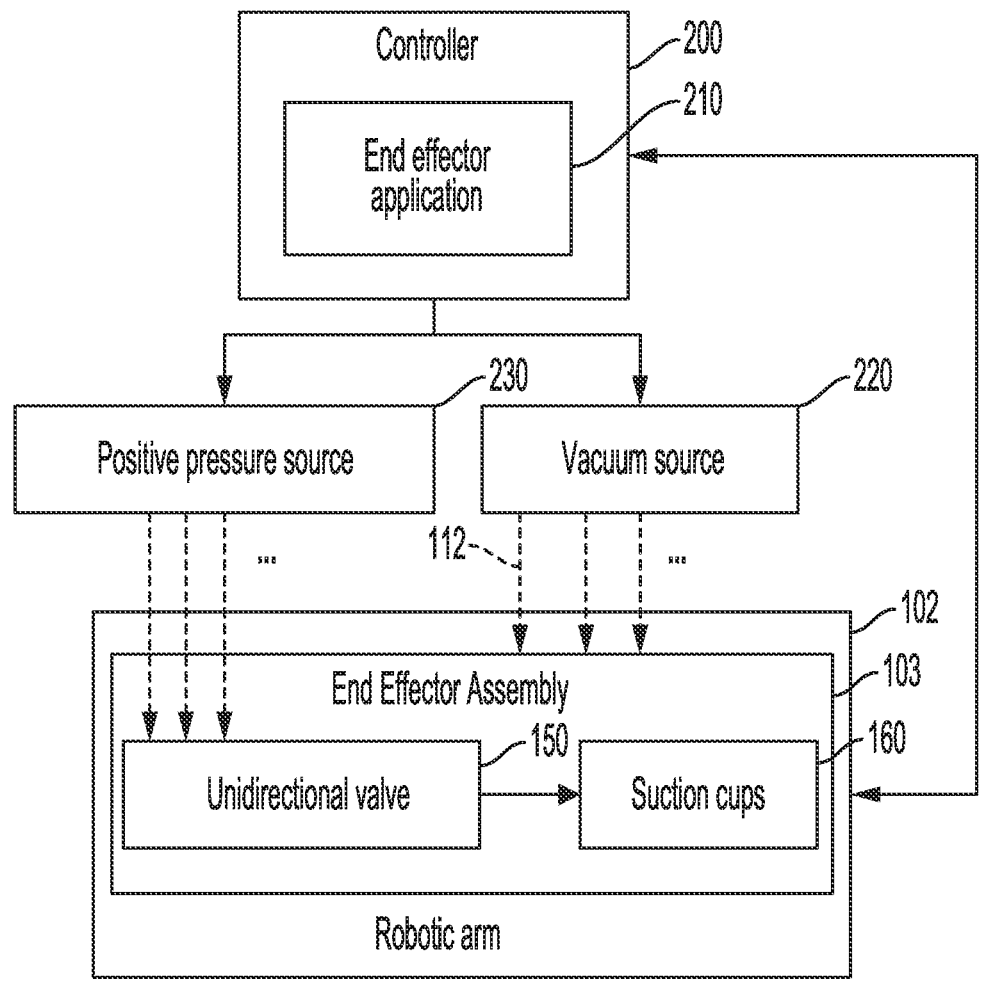
FIG. 2 illustrates an example of a block diagram of the robotic system from FIG. 1 in accordance with various embodiments.

FIG. 2 illustrates a block diagram of an example of the robotic system 100 from FIG. 1. The robotic system 100 may include a controller 200, a vacuum source 220, and a positive pressure source 230, each of which may be configured to directly or indirectly cooperate with the end effector assembly 103. The controller 200 may be configured to control operation of the vacuum source 220, the positive pressure source 230, and the end effector assembly 103 to achieve automatic movement of the item 106 from one location to another. The vacuum source 220 may provide the suction pressure to pick up the item 106. For example, the vacuum source 220 may be a vacuum pump or a vacuum generator (e.g., pneumatically using compressed air or electrically using a displacement pump to generate vacuum). The positive pressure source 230 may be supplied to the components at the end effector assembly 103 to facilitate selective delivery of the suction pressure to particular locations of the item 106 through the suction cups (e.g., 160) at the end effector assembly 103. For example, the positive pressure source may be a pneumatic pump to pump air at a pressure greater than atmospheric pressure, or an electro-magnetic source configured to apply force to move, e.g., a piston against an opposing force.

The end effector assembly 103 may include a valve bank 150 coupled to a plurality of suction cups 160. In some embodiments, the valve bank 150 may include a plurality of unidirectional valves. In this case, the valve bank 150 may also be referred to as unidirectional valves 150. In some embodiments, each unidirectional valve 150 may be coupled with a suction cup 160 to control the supply of suction pressure to the suction cup 160. In some embodiments, the hoses 112 (see FIG. 1) may be coupled at one end of the unidirectional valve and the suction cup may be coupled at other end.

The term "unidirectional valve" as discussed herein may refer to a valve that allows a fluid or pressure to flow through a channel in one direction. The unidirectional valve may provide ability to control flows and pressures in a desired direction. In an example, the flow can be controlled by opening the channel to allow pressure flow or closing the channel to prevent pressure flow. In some embodiments, the unidirectional valve allows a unidirectional flow of vacuum pressure from a vacuum source to a suction cup. The unidirectional valve may be a pneumatic valve that can be actuated pneumatically, electro-magnetically actuated, actuated by a spring, or other actuating mechanisms. Such unidirectional valve may differ from a bidirectional valve, which allows fluid or pressure to flow through a channel in both direction (e.g., from inlet to outlet and from outlet to inlet).

In some embodiments, the positive pressure source 230 may be a pneumatic source or an electro-magnetic source for activating or deactivating the valves 150. In some embodiments, the positive pressure source 230 may be pneumatically coupled to the unidirectional valves 150. The positive pressure source 230 may supply positive pressure to one or more of the unidirectional valves 150 to open the valves. When the positive pressure is removed, the unidirectional valve 150 may close. In some embodiments, components may be instead arranged so that the effect of positive pressure may be reversed (i.e., where supplying positive pressure closes the valve and cessation of positive pressure allows the valve to open). In some embodiments, positive pressure refers to a pressure value greater than atmospheric pressure. In some embodiments, the positive pressure may be less than 75 kPa. The opening or closing of the one or more of the unidirectional valves 150 may facilitate supply of the suction pressure or cut-off the suction pressure to one or more of the suction cups 160. The opening or closing of the one or more of the unidirectional valves 160 may be achieved by moving a piston independently of the suction cup 150.

In some embodiments, the controller 200 can be configured to control the robotic arm 102, the end effector assembly 103, components installed at the end effector assembly 103, the vacuum source 220, and/or the positive pressure source 230. For example, the controller 200 can be configured to control a movement of the end effector assembly 103 via the robotic arm 102 to move the item 106 from one location to another. The controller 200 can be configured to control an amount of suction pressure by controlling the vacuum source 220. The controller 200 is configured to individually activate the set of unidirectional valves 150 for opening or closing the flow path to the individual suction cup of the suction cups 160. For example, the controller 200 can be configured to control the positive pressure source 230 to selective open or close one or more unidirectional valves to activate or deactivate suction pressure to be supplied to the suction cup coupled to the one or more unidirectional valves.

As an example, when picking up the item 106, the controller 200 may instruct the positive pressure source 230 to supply positive pressure to one or more of the unidirectional valves 150 to deactivate one or more of the suction cups 160 so that only some suction cups 160 receive suction pressure to pick up the item 106. For example, a subset of suction cups that can cover a desired region (e.g., at a center, at an edge, at a label, etc.) of the item 106 may be kept active while other suction cups may be deactivated. When the item 106 is attached to at least some of the suction cups 160, the controller can move the end effector assembly 103 via the robotic arm to move the item 106 to another location. At that other location, the item 106 can be placed or dropped, e.g., by deactivating the suction cups 160 holding the item 106. For example, the controller 200 can instruct the positive pressure source 230 to remove the positive pressure to the unidirectional valves 150 attached to the suction cups 160 holding the item 106. Additionally or alternatively, the controller 200 can instruct the vacuum source 220 to remove the suction pressure to the unidirectional valves 150 for dropping/placing the item 106.

Example constructions of a unidirectional valve, arrangement of the unidirectional valve to form a valve bank 150, coupling of suction cups 160 to the valves, and other components to facilitate attachment to the end effector assembly 103 are discussed in further detail below. The examples are used to explain the concepts herein without limiting the scope of the present disclosure.

Figure 3:
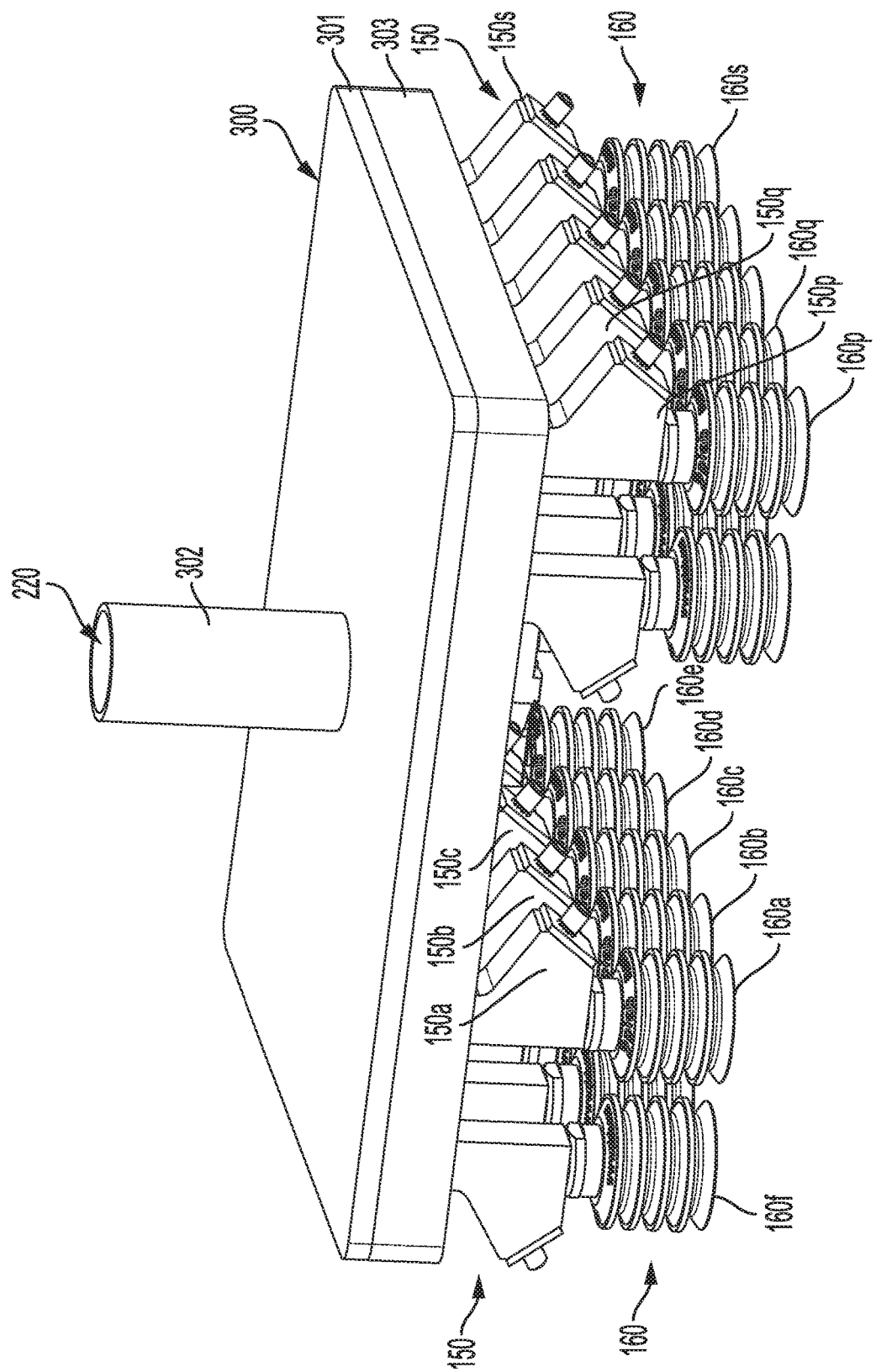
FIG. 3 illustrates a top perspective view of an example construction of an end effector assembly that may be utilized in the robotic system of FIG. 1 in accordance with various embodiments.
Figure 4:
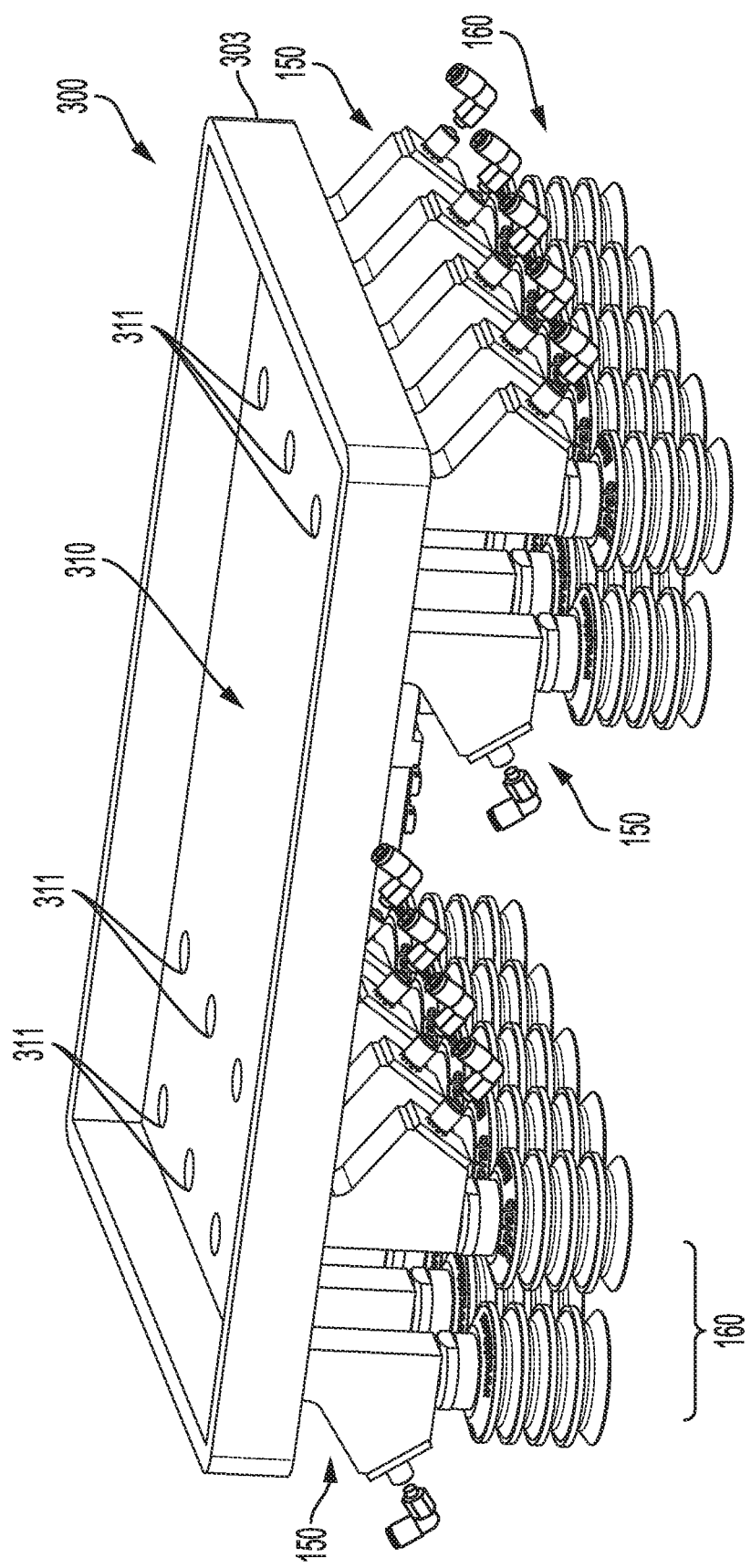
FIG. 4 illustrates a top perspective view of the end effector assembly of FIG. 3 with a top cover removed in accordance with various embodiments.

FIGS. 3 and 4 illustrate a top perspective view of an example construction of the end effector assembly 103. The end effector assembly 103 may include a plurality of suction cups 160 (e.g., individually referred as 160a, 160b, 160c, ..., 160p, 160q, etc.) and a set of unidirectional valves 150 (e.g., individually referred as 150a, 150b, 150c, ..., 150p, 150q, etc.) coupled to the plurality of suction cups 160. The plurality of suction cups 160 may individually receive suction pressure from the vacuum source 220. The set of unidirectional valves 150 can individually control supply or cut-off of the suction pressure to an individual suction cup of the plurality of suction cups 160.

In some embodiments, the end effector assembly 103 may include a hub 300 couplable to the distal-most end of the robotic arm (e.g., the end 105 in FIG. 1). One end of each of the set of unidirectional valves 150 may be supported by the hub 300, and the other end may be individually coupled to the plurality of suction cups 160.

In some embodiments, the hub 300 may include a top cover 301 with an inlet port 302 and a bottom cover 303. The inlet port 302 may be coupled to a single hose from the vacuum source (e.g., 220) or may receive multiple hoses inside the inlet port 302. In some embodiments, the top cover 301 may be sealing (e.g., air tight) closed with the bottom cover 303 to prevent suction pressure from leaking through the hub 300. In some embodiments, the hub 300 includes a hollow chamber 310 (see FIG. 4) between the top cover 301 and the bottom cover 303 to allow suction pressure to be contained within the chamber 310. In some embodiments, the hollow chamber 310 can absorb pressure fluctuations to facilitate a smooth package handling operation.

In some embodiments, as shown in FIG. 4, the bottom cover 303 of the hub 300 may include branched flow conduits 311 configured to convey suction pressure from a vacuum source (e.g., 220) to the plurality of suction cups 160. The branched flow conduits 311 may convey the suction pressure along individual flow paths leading to each of the plurality of suction cups 160 (e.g., individually referred as 160a, 160b, 160c, ..., 160p, 160q, etc.). In some embodiments, the branched flow conduits 311 may be holes for pneumatically connecting the chamber 310 to the individual suction cups. In some embodiments, the branched flow conduits may be a plurality of hoses, each hose conveying suction pressure to a particular suction cup of the suction cups 160. For example, the plurality of hoses may be hoses 112 of FIG. 1.

In some embodiments, the vacuum source may be a single source and the plurality of suction cups 160 receive the suction pressure from a shared suction source (e.g., 220) through the branched flow conduit 311. In some embodiments, multiple vacuum sources (not illustrated) may be provided and the suction pressure from each vacuum source may be directed to the branched flow conduits 311. For example, multiple hoses from different vacuum source can be received through the port 302 and pneumatically coupled (e.g., through the chamber 310) to the branched flow conduits 311.

Figure 5:
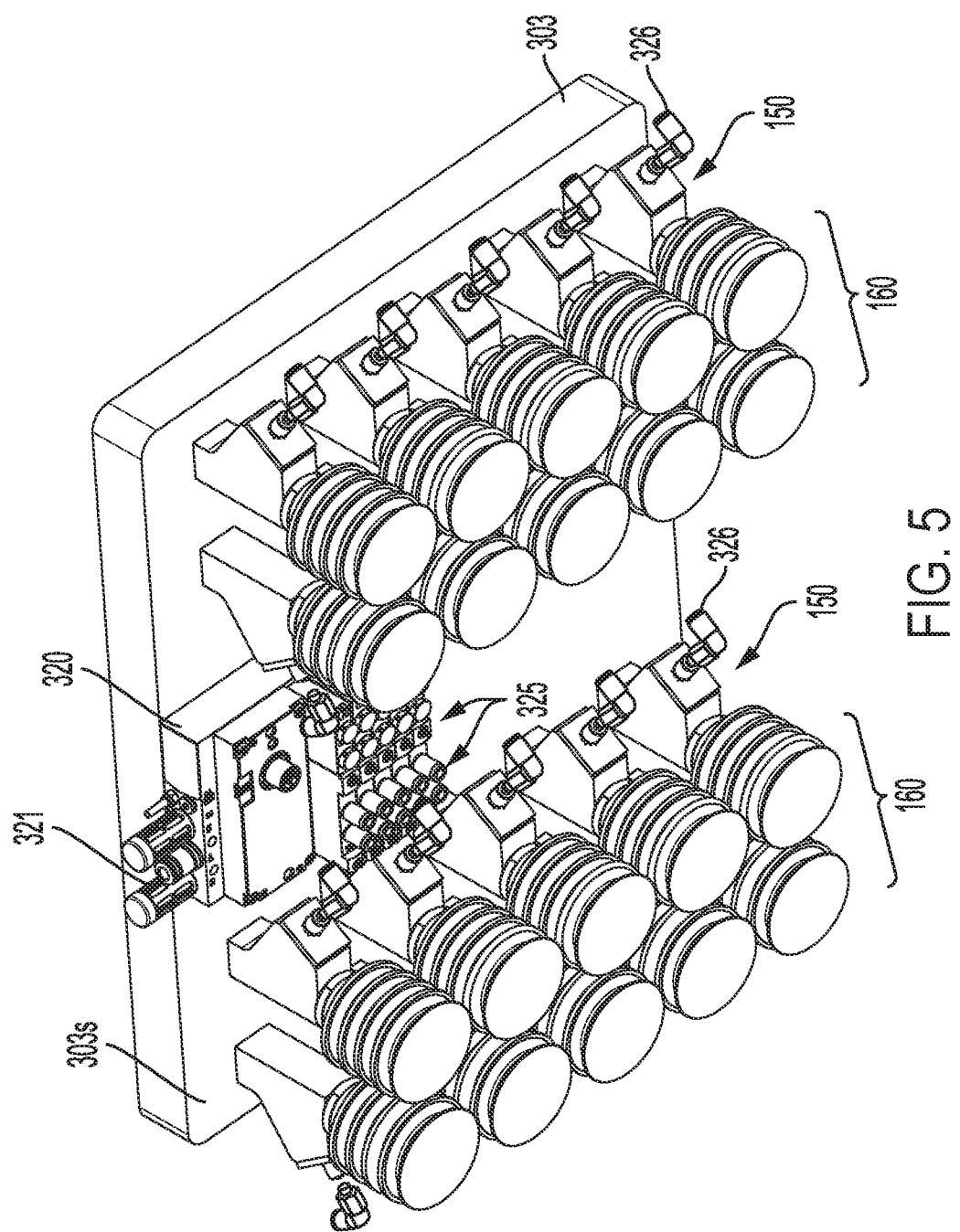
FIG. 5 illustrates a bottom perspective view of the end effector assembly of FIGS. 3-4 configured to supply positive pressure from a bottom side in accordance with various embodiments.

FIG. 5 illustrates a bottom perspective view of the end effector assembly 103 of FIGS. 3 and 4. In some embodiments, the end effector assembly 103 may further include a pneumatic manifold 320 coupled to a bottom surface 303s for conveying positive pressure to actuate an individual unidirectional valve of the valves 150. In some embodiments, the pneumatic manifold 320 may include an inlet port 321 and a plurality of outlet port 325. The inlet port 321 can be coupled to a positive pressure source (e.g., the source 230 in FIG. 2) to receive the positive pressure and each of the plurality of outlet ports 325 can direct the positive pressure to a particular unidirectional valve of the set of unidirectional valves 150. The pneumatic manifold 320 may provide a compact arrangement for distributing the positive pressure to individual valves. For example, a single hose may be connected between the positive pressure source 230 and the inlet port 321 and multiple small hoses may be coupled between the outlet ports 325 and the set of unidirectional valves 150. For example, the hoses may be connected to the outlet ports 325 of the pneumatic manifold 320, and individual connectors 326 coupled to each of the unidirectional valve 150. The individual connector 326 may be coupled via threaded or other fastening means that provide an air tight connection between the hose and the connector 326.

In some embodiments, the unidirectional valves 150 may be arranged in rows and columns as shown in FIG. 5. In some embodiments, eight or more unidirectional valves 150 may be attached to the hub 300. However, the present disclosure is not limited to a particular arrangement or a number of the unidirectional valves. For example, the unidirectional valves 150 may be arranged in a circular manner, at selected positions on the hub 300, or any other configuration depending on the size and shape of the items to be picked up.

In some embodiments, the unidirectional valves 150 are smaller and lighter than standard bidirectional valves. The unidirectional valve can have fewer components for actuating (e.g., a single port to receive positive pressure) compared to a bidirectional valve. The smaller and lighter construction may enable the valves to be disposed at the end effector without substantially affecting the payload capacity of item handling (or with having a reduced payload impact compared to other heavier arrangements). In addition, because the valves can be located close to the item 106, a faster activation and deactivation of the suction pressure to the suction cups can be achieved. In turn, the item 106 handling speed can be increased compared to other package handling mechanisms.

It can be understood that the present disclosure is not limited to supplying positive pressure via the pneumatic manifold 320 installed at the bottom surface 303s of the end effector assembly 103. In some embodiments, the pneumatic manifold 320 may be installed at a top surface of the end effector assembly 103, distant from the end effector assembly 103, or other locations of the robotic arm 102.

Figure 6:
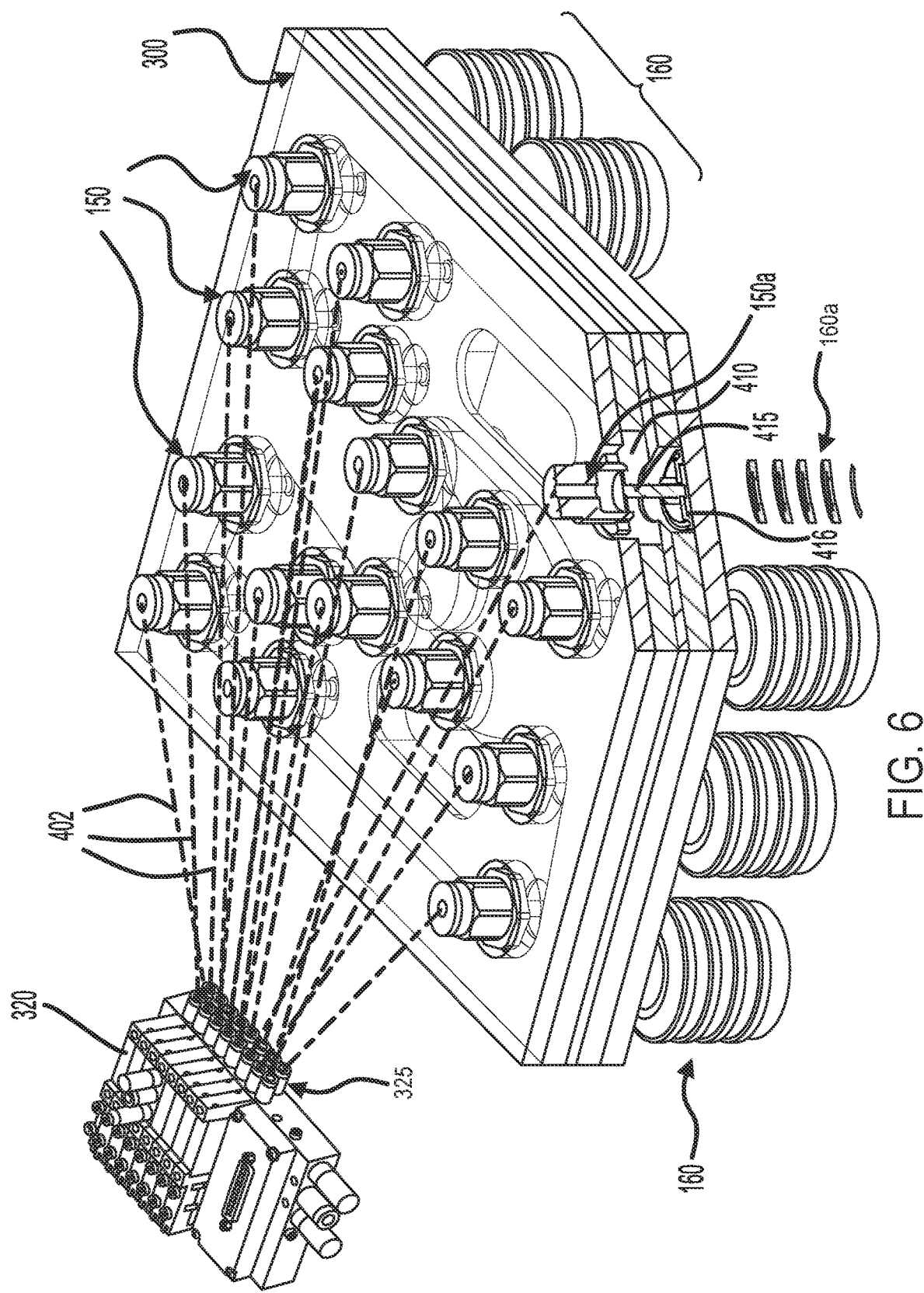
FIG. 6 illustrates a top perspective view of the end effector assembly configured to supply positive pressure from a top side in accordance with various embodiments.

FIG. 6 illustrates a top perspective view of the end effector assembly 103 configured to supply positive pressure from a top side. The pneumatic manifold 320 may be installed distant or remote from the end effector assembly 103, and the positive pressure may be distributed from the outlet ports 325 through multiple pipes 402 (e.g., shown schematically as dashed lines in FIG. 6 to not obscure other features in the view). The pipes 402 may be individually coupled to the unidirectional valves 150 (e.g., valve 60 of FIG. 7). In some embodiments, the unidirectional valves 150 (e.g., as may be most easily seen with respect to the valve 150a shown in a cutaway view in FIG. 6) may include a cylindrical body 410 housing a piston 415. The cylindrical body 410 may be attached (e.g., via threads on the cylinder, nut-bolt, or other fastening means) to the hub 300. The piston 415 may be attached to a restriction member 416 having a disk shape to open or close a flow path leading to the suction cups 160 (e.g., to the suction cup 160a that is also shown in cutaway view in FIG. 6). The positive pressure may be supplied to the unidirectional valves 150 from a top side to push the piston and open the corresponding valve 150.

Example constructions and operation of the unidirectional valves are further discussed in detail with respect to FIGS. 7-16 below.

Figure 7:
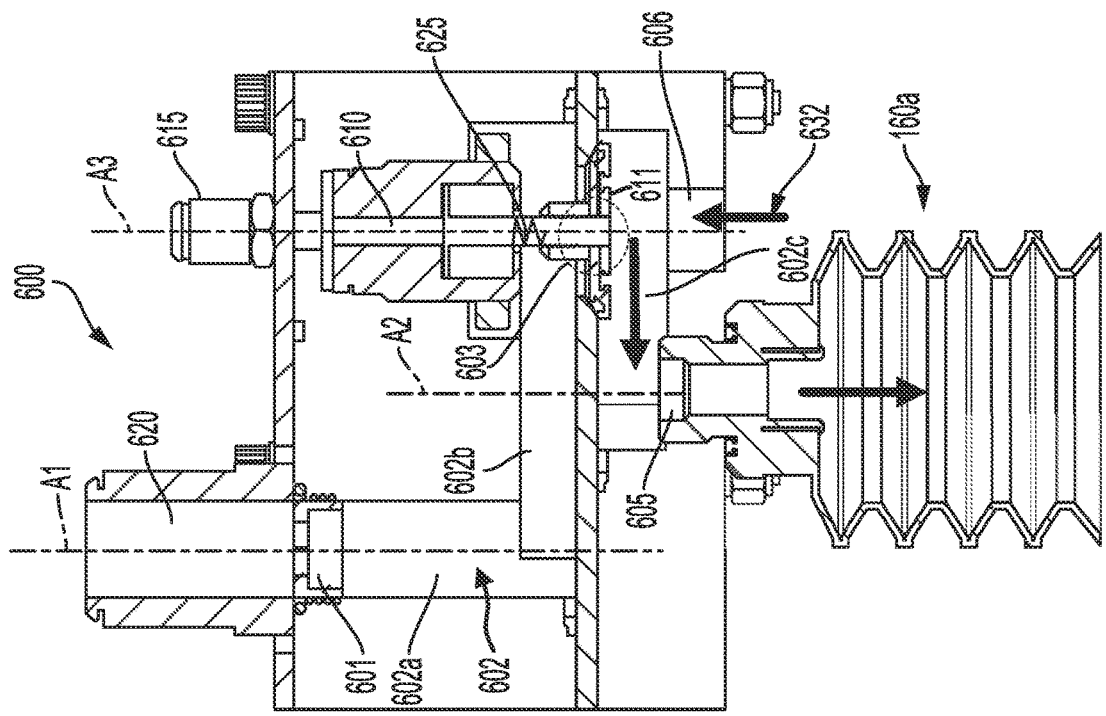
FIG. 7 illustrate an example of an open state of a unidirectional valve that includes a pneumatically actuated piston and a discharge port to atmosphere in accordance with various embodiments.
Figure 8:
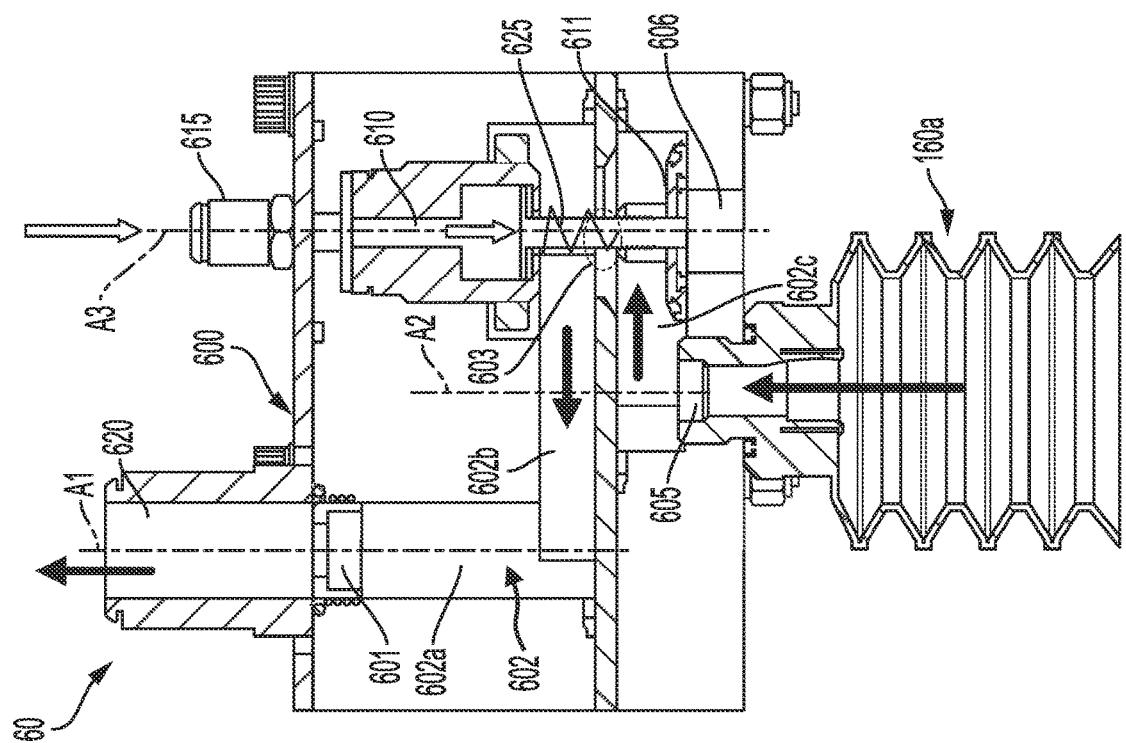
FIG. 8 illustrate an example of a closed state of the unidirectional valve of FIG. 7 in accordance with various embodiments.

FIGS. 7 and 8 illustrate an example of a unidirectional valve 60, according to some embodiments. The unidirectional valve 60 can be employed in the set of unidirectional valves 150 as discussed herein. In some embodiments, the unidirectional valve 60 includes a valve body 600 configured to be attached to the hub 300 (in FIGS. 3-5) by fastening mechanisms such as screws, nuts, threaded joints, adhesives, or other fasteners.

The valve body 600 may include a first port 601 (e.g., an inlet port) to receive the suction pressure from a vacuum source (e.g., 220) and a second port 605 configured to deliver the suction pressure to a suction cup (e.g., 160a) of the plurality of suction cups 160. The valve body 600 may also include a discharge port 606, e.g., which may be open to the atmosphere or atmospheric pressure. The valve body 600 may include a first flow path 602 (e.g., most easily seen in FIG. 7) extending between the first port 601 and the second port 605. The valve body 600 may also include a second flow path 632 (e.g., most easily seen in FIG. 8) extending between the second port 605 and the discharge port 606. Furthermore, the valve body 600 can include a piston rod 610 coupled with a restriction member 611. In use, the restriction member 611 may be movable to supply or cut-off the suction pressure to the suction cup (e.g., 160a) by exposing or blocking the first flow path 602. The piston rod 610 can be pneumatically actuated by a positive pressure source (e.g., the source 230 in FIG. 2) to block or unblock the first flow path 602. The opening or closing of the one or more of the unidirectional valves 150 can be achieved by moving a piston rod 610 and the restriction member 611 independently of the suction cup 160. For example, one of the suction cups 160 may be fixed coupled to a valve body so that the suction cup 160 does not move relative to the corresponding valve 150 while the piston rod 610 moves the restriction member 611 to block or unblock the first flow path 602.

In some embodiments, the flow path 602 may be divided into a plurality of flow segments including a first flow segment 602a, a second flow segment 602b, and a third flow segment 602c. In some embodiments, one or more flow segments may be pneumatically coupled via an opening or an orifice such as an opening 603. The opening 603 may be opened or closed by a restriction member 611 to facilitate an open or closed state of the valve 60. The restriction member 611 may have a shape that may include, but is not limited to, a cylindrical shape, a conical shape, a wedge shape, a rounded rectangle shape, a partially spherical shape, a ball shape, or other geometric shape.

In some embodiments, the first flow segment 602a can convey the suction pressure from the first port 601 to the second flow segment 602b uninterrupted. The second flow segment 602b may convey the suction pressure from the first flow segment 602a through the opening 603 to the third flow segment 602c leading to the suction cup 160a. If the opening 603 is closed (e.g., by the restriction member 611), the suction pressure may be interrupted and prevented from being conveyed to the suction cup 160a. As shown, the opening 603 may be opened or closed by the restriction member 611.

In an open state, as shown in FIG. 7, all the flow segments 602a-602c may be open or fluidically connected to provide a unidirectional flow path from the first port 601 to the second port 605. To open the flow path 602, the piston 610 may be actuated by supplying a positive pressure at a positive pressure receiving port 615. The positive pressure can push the piston 610 towards the discharge port 606 (or in the direction of the suction cup 160a or an item 106 to be picked). For example, in FIG. 7, the piston 610 may be pushed downward causing the restriction member 611 to open the opening 603, e.g., thereby fluidically connecting the flow segments 602b and 602c. Accordingly, the suction pressure can be conveyed from the first port 601 to the second port 605. Also, as the piston 610 moves downward, the restriction member 611 may close the discharge port 606 to the atmosphere. As such, the restriction member 611 may prevent leakage of the suction pressure to the atmosphere through the discharge port 606. In the open state, an item (not shown in FIG. 7) can be picked up by suction pressure at the suction cup 160a.

In a closed state, as shown in FIG. 8, the opening 603 between the second segment 602b and the third flow segment 602c may be closed, thus cutting off suction pressure through the flow path 602 to the suction cup 160a. The flow path 602 may be closed by removing the positive pressure to the piston 610. The piston 610 may be actuated by a spring 625 and/or assisted by the suction pressure causing the restriction member 611 to move toward the opening 603 and close it. In some embodiments, the spring 625 may be disposed axially along the piston 610 at the restriction member 611. When the positive pressure is supplied at the positive pressure receiving port 615, the spring 625 may be stretched and remain in tension until the positive pressure is removed.

As the positive pressure is removed, the spring 625 can retract under tension and push the piston 610 away from the discharge port 606 (or away from the direction of the suction cup 160a or the item). For example, in FIG. 8, the piston 610 may be pushed upward causing the restriction member 611 to close the opening 603 while opening the discharge port 606. Thus, fluidic connection between the flow segments 602b and 602c is closed, while the suction cup 160a may receive the atmospheric pressure through the third flow segment 602c. Accordingly, the suction pressure may be cut off to the suction cup 160a, e.g., to deactivate the suction cup 160a from being available for use to pick up an item (not shown in FIG. 8). If an item (e.g., 106) is initially coupled to the suction cup 160a, the item (e.g., 106) may be dropped when the valve 60 is moved to the closed state. For example, the atmospheric pressure can push the item (e.g., 106) downward in addition to the self-weight of the item (e.g., 106).

In some embodiments, referring to FIGS. 7-8, the ports 601, 605, and 606, the flow path 602, and the piston 610 may be designed to allow a compact valve design. In the example shown, the first port 601 and the first flow segment 602a may be along a first axis A1, the suction cup 160a may be disposed along a second axis A2, and the piston 610 may be disposed along a third axis A3. For compact design, the suction cup 160a may be disposed between the first axis A1 and the third axis A3. Accordingly, the first flow segment 602a can extend along the first axis A1, the second flow segment 602b can extend between the first axis A1 and the third axis A3, and the third flow segment 602c may extend between the third axis A3 and the second axis A2. The third flow segment 602c may trace back along a similar path (e.g., a parallel path) relative to the second segment 602b, and may be offset from the second flow segment 602b so that the flow segments do not intersect each other. In some embodiments, the first axis A1, the second axis A2, and the third axis A3 may be substantially parallel to each other. However, the present disclosure is not limited to a particular orientation of the axes or the components. For example, in some cases, the third axis A3 may be inclined with respect to the first axis A1 or the second axis A2. In other words, the piston 610 may be inclined with respect to other members of the valve 60 depending on space constraints and/or assembly constraints associated with the end effector 103.

In some embodiments, referring to FIGS. 3, 6, 7 and 8, the first port 601 may be coupled to the hub 300 by an inlet connector 620. For example, the inlet connector 620 may be attached at or along the bottom portion 303 of the hub 300. A hole of the branched flow conduit 311 may be aligned with the inlet connector 620 to receive the suction pressure from the chamber 310 into the first flow segment 602a. In some embodiments, the second port 605 may be coupled to the suction cup 160a by an outlet connector.

Figure 9:
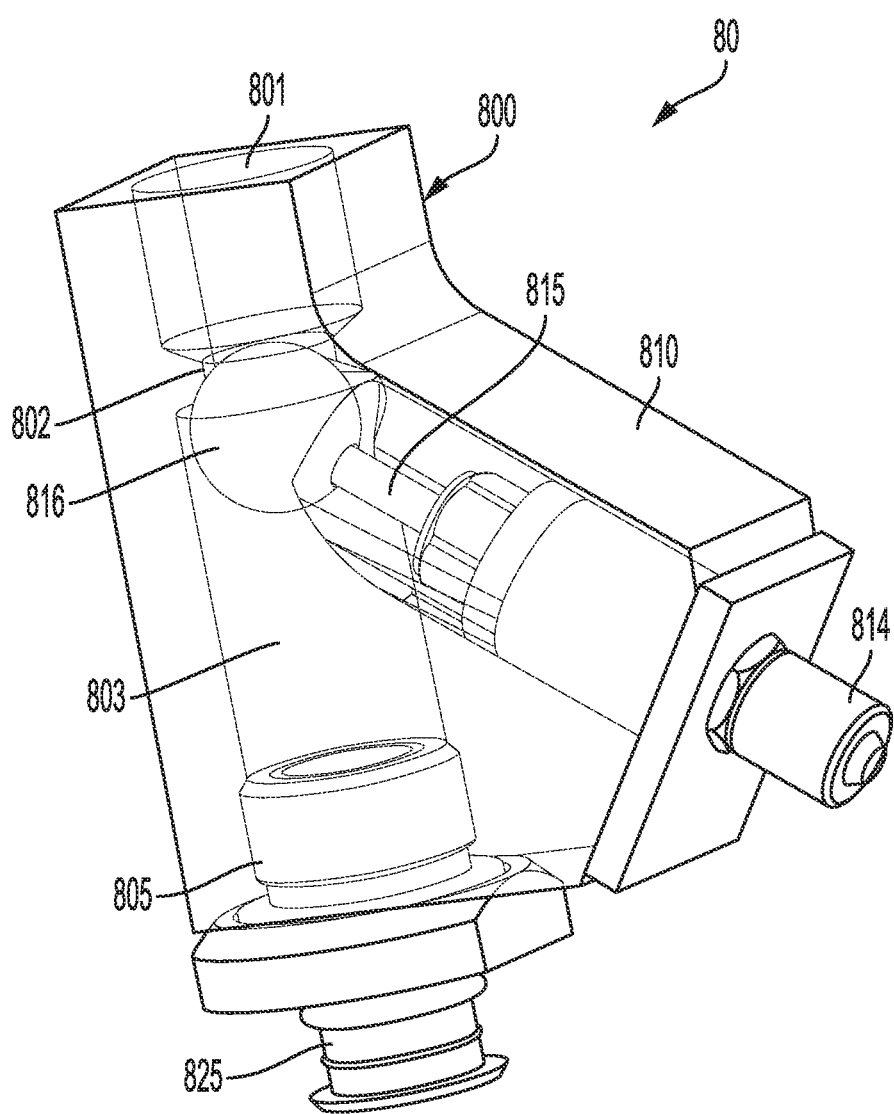
FIG. 9 is a perspective view of an example of a unidirectional valve having an angled pneumatically actuated piston in accordance with various embodiments.
Figure 10:
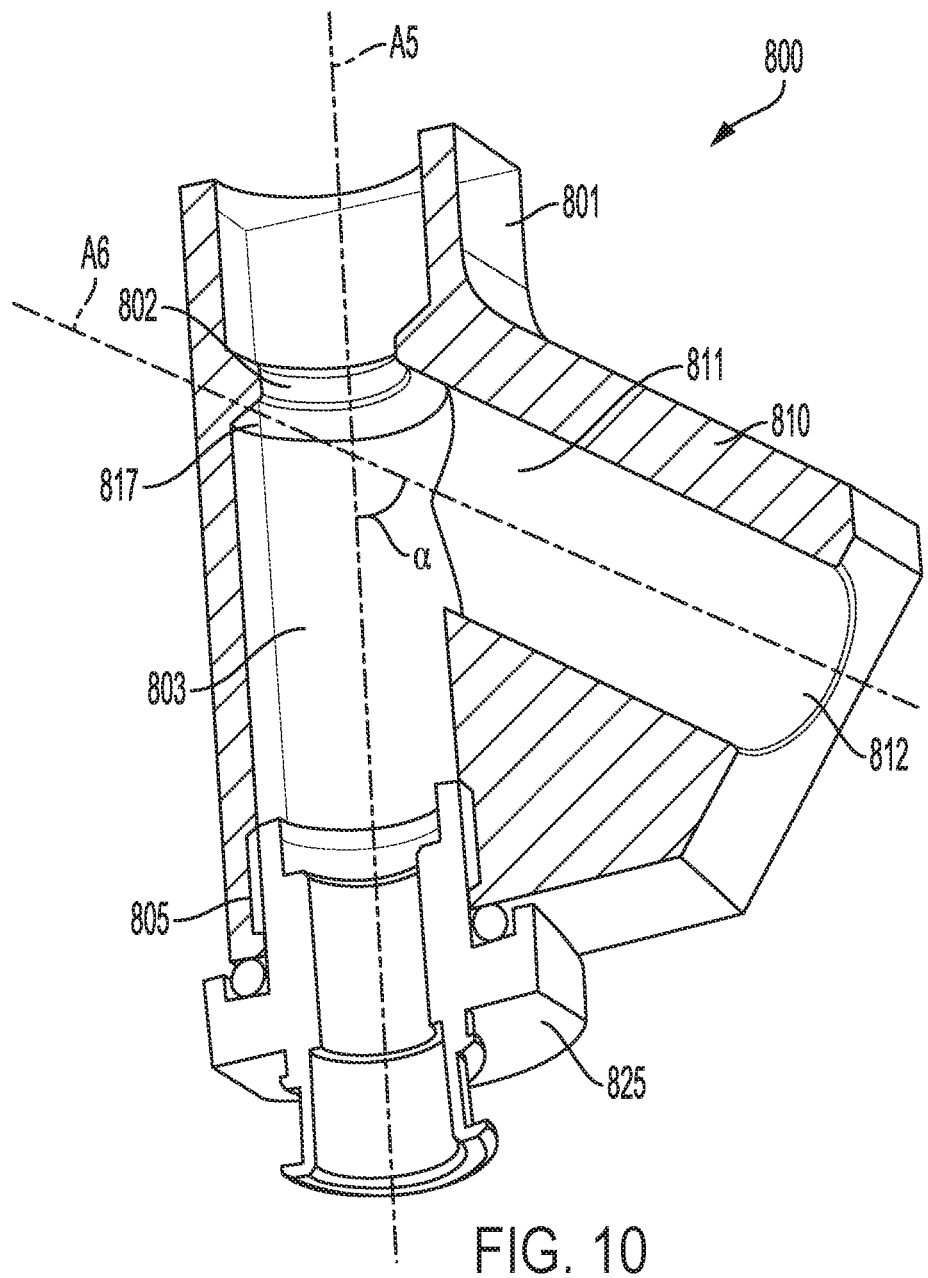
FIG. 10 is a cross-sectional view of the unidirectional valve of FIG. 9 in accordance with various embodiments.
Figure 11:
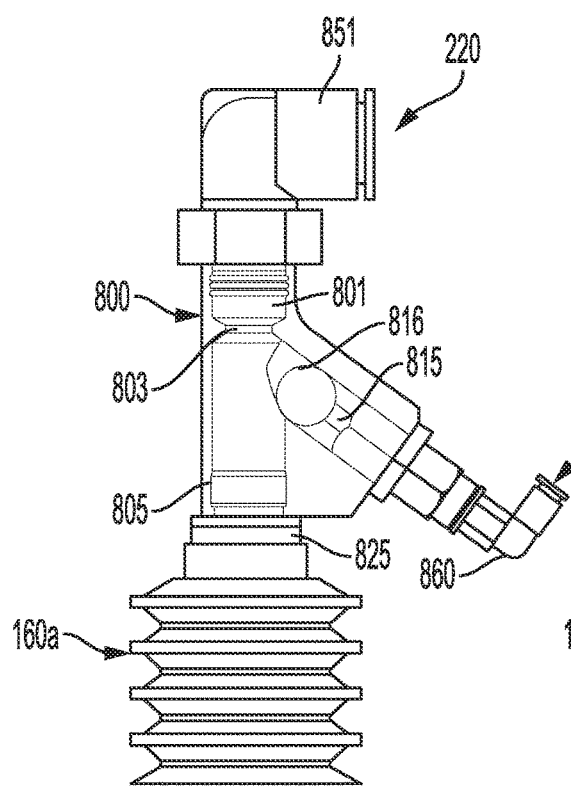
FIG. 11 illustrates an open state of the unidirectional valve of FIG. 9 in accordance with various embodiments.
Figure 12:
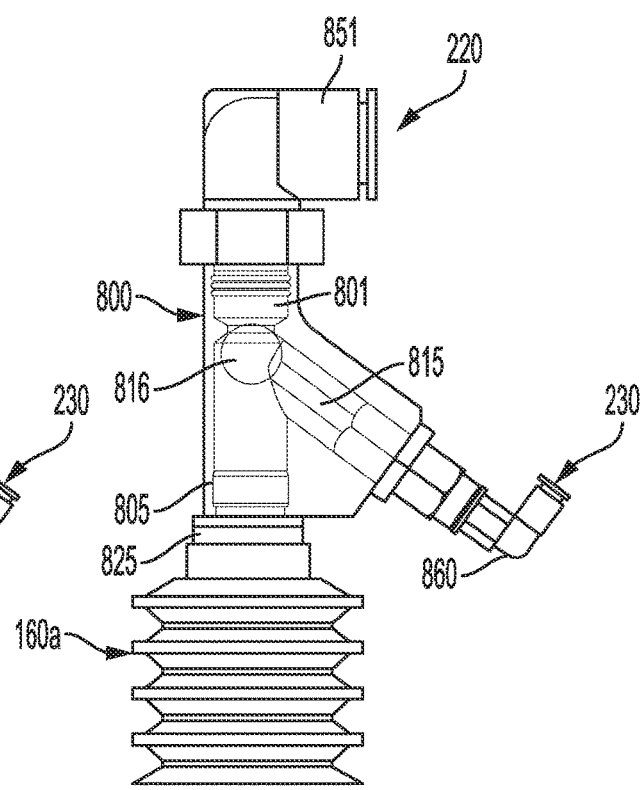
FIG. 12 illustrates a closed state of the unidirectional valve of FIG. 9 in accordance with various embodiments.

FIGS. 9-12 illustrate another example of a unidirectional valve 80, according to some embodiments. FIG. 9 illustrates the unidirectional valve 80 with a piston 815 disposed therein. FIG. 10 is a cross-sectional view of a valve body 800 showing internal geometry and construction of the valve body. FIG. 11 illustrates the valve 80 in an open state, and FIG. 12 illustrates the valve 80 in a closed state. The construction and operation of the unidirectional valve 80 is further discussed in detail below.

The unidirectional valve 80 includes a valve body 800 configured to receive a suction pressure, to receive a movable piston 815, and to convey the suction pressure to a suction cup (e.g., 160a). In some embodiments, the valve body 800 includes a first port 801 to receive suction pressure (e.g., from a vacuum source 220), a second port 805 to couple with a suction cup of the plurality of suction cups (e.g., 160), and a flow path 803 extending between the first port 801 and the second port 805. Along the flow path 803, an opening 802 may be provided to open or close the flow path 803. The opening or closing of the unidirectional valves 80 can be achieved by moving a movable piston 815 independently of the suction cup 160. For example, a suction cup 160 may be fixed coupled to a valve body 800 so that the suction cup 160 does not move relative to the corresponding valve 150 while the movable piston 815 moves a restriction member to block or unblock the first flow path 803.

In some embodiments, referring to FIG. 10, the valve body 800 includes a piston receiving portion 810 to receive the piston 815. The piston receiving portion 810 may include a piston chamber 811 to receive the piston 815 through a piston receiving port 812. In some embodiments, as shown in FIGS. 9, 11, and 12, the movable piston 815 may be coupled with a positive pressure receiving port 814 at one end and a restriction member 816 at an opposite other end. The restriction member 816 may be configured to open or close the opening 802 so that the suction pressure may be supplied or cut off to the flow path 803. In some embodiments, the restriction member 816 may be sized to close the opening 802 but can be of any geometric shape that can be accommodated in the piston receiving portion 810. For example, the restriction member 816 may be spherical or ball shaped. In some embodiments, a spherical shaped member 816 may provide benefits in terms of reduced friction and low positive pressure compared to other shapes. However, the present disclosure is not limited to a spherical shaped member. In some examples, the restriction member 816 may be cylindrical, conical, wedge, rounded rectangle, partially spherical, or other geometric shape.

In some embodiments, as shown in FIG. 10, the opening 802 may include a seat portion 817 to receive the restriction member 816. The seat portion 817 may be shaped to correspond to the shape of the restriction member 816. In some embodiments, the flow path 803 may be substantially cylindrical in shape. In some embodiments, the diametrical size of the opening 802 may smaller than a diametrical size of the flow path 803.

In some embodiments, as illustrated in FIG. 10, the first port 801 may be axially aligned with the second port 805 to provide a compact design. The flow path 803 can also extend axially between the first port 801 and the second port 805. For example, the first port 801, the flow path 803, and the second port 805 may be aligned along a longitudinal axis A5. In some embodiments, the piston 815 may be disposed along another axis A6 inclined with respect to the flow path 803 or the corresponding longitudinal axis A5. In some embodiments, an angle of inclination a between the axis A6 of the piston 815 and a direction along the axis A5 extending toward the second port 805 may be an acute angle. Accordingly, depending on the orientation of the valve 80, the angle of inclination a may be an acute angle with respect to a downward direction or the direction of the gravity.

In some embodiments, a length of the piston 815 may be such that in a retracted position, the restriction member 816 does not enter the flow path 803. In such state, suction pressure may be allowed to freely flow toward the suction cup (e.g., 160a). To close the flow path 803, the piston 815 may be actuated, e.g., causing the restriction member 816 to move toward the opening 802. As the restriction member 816 enters the flow path 803, the suction pressure within the flow path 803 may suck the restriction member 816 into position closing the opening 802. As a result, the suction pressure may be cut off from the suction cup (e.g., 160a).

In some embodiments, the valve 80 may be open in a ready or default state. In the open state, the piston 815 may be in a retracted state away from the flow path 803. In such a retracted state, the piston 815 may be experiencing no positive pressure applied to the piston 815 through the receiving port 812. As such, the suction pressure can be conveyed to the suction cup 160a continuously through the unobstructed flow path 803. Accordingly, in some embodiments, items can be picked up without deactivating any of the suction cups 160. However, in some cases, depending on the size of the item (such as if a package has a smaller footprint than a footprint of the entire array of suction cups 160), one or more suction cups may be deactivated so that the end effector 103 applies suction pressure on the item at selected locations. As the suction pressure may be received from a shared vacuum source, the unidirectional valve facilitates selective deactivating of the suction cups to define an active set of suction cups to be used to pick up an item. This way, vacuum leakage may be prevented and a more energy efficient solution for item handling can be advantageously obtained.

FIG. 12 illustrates the closed state of the valve 80. The piston 815 can receive the positive pressure from the positive pressure source 230, which in turn may cause the restriction member 816 to close the opening 802. When closed, the suction pressure from the vacuum source 220 may be cut off from the suction cup 160a. In some embodiments, the vacuum pressure may be sufficient to retain the restriction member 816 in the closed state even if the positive pressure is ceased. The valve 80 may accordingly facilitate efficient energy utilization by only utilizing the positive pressure to initially move the restriction member 816 toward the closed state instead of necessitating maintaining the positive pressure to also maintain the restriction member 816 in the closed state.

In some embodiments, to open the flow path 803 from a closed state, the positive pressure may be removed and/or the vacuum pressure may be removed. Ceasing the positive pressure and/or the vacuum pressure may allow the restriction member 816 to retract back into the piston receiving portion 810 (e.g., under the effect of gravity). Accordingly, even with a low positive pressure (e.g., less than 100 kPa), the valve 80 may be operated.

FIG. 11 illustrates the open state of the valve 80. The piston 815 can retract when the positive pressure from the positive pressure source 230 is removed and/or when the vacuum pressure from the vacuum source 220 is removed. Retracting the piston 815 may cause the restriction member 816 to open the opening 802. When open, the suction pressure from the vacuum source 220 may be supplied to the suction cup 160*a*.

In some embodiments, connectors may be attached to the different ports of the valve body 800 to facilitate assembly with different components such as the end effector 103, the vacuum source 220, and/or the positive pressure source 230. For example, a first connector 851 (in FIGS. 11-12) may be attached to the first port 801 to couple the valve to the hub 300 (in FIG. 4) to align the flow path 803 with a hole of the branched flow conduits 311 (in FIG. 4). A second connector 825 (in FIGS. 9-12) may be attached to the second port 805 to couple the suction cup 160*a*. A third connector 860 may be attached to the piston receiving port 812 to receive positive pressure for driving the piston 815.

FIGS. 13-16 illustrate yet another an example of a unidirectional valve 1200. The unidirectional valve 1200 may have an electro-magnetically actuated piston, according to some embodiments.

As depicted, the unidirectional valve 1200 includes a first port 1201 to receive suction pressure (e.g., from a vacuum source 220), a second port 1205 to couple with a suction cup of the plurality of suction cups (e.g., 160), and a flow path 1203 extending between the first port 1201 and the second port 1205. Along the flow path 1203, an opening 1202 may be present and manipulable to open or close the flow path 803. In some embodiments, the flow path 1203 may be divided into a first flow segment 1203*a* and a second flow segment 1203*b*. As shown, the first flow segment 1203*a* may be non-coaxial (e.g., inclined or perpendicular) to the second flow segment 1203*b*. The suction pressure (shown by arrows representing airflow direction in the flow path 1203 in FIGS. 13 and 14) can be conveyed from the first port 1201 through the flow path 1203 to the second port 1205.

In some embodiments, the valve 1200 may include a piston 1215 that can be actuated by a supplying current to a coil 1220 placed around the piston 1215. The piston 1215 may also be spring-actuated. For example, the piston 1215 may be coupled to a spring 1230, e.g., which may be at least partially outside the valve 1200. In some embodiments, the piston 1215 may include a restriction member 1216 configured to open or close the opening 1202 so that the suction pressure may be supplied or cut off relative to the flow path 1203. In some embodiments, the piston 1215 is axially aligned with the port 1201 and the first flow segment 1203*a*.

FIG. 13 illustrates an open state in which the piston 1215 may be pulled downward by the spring 1230 to open the opening 1202 so that the suction pressure can flow from the first port 1201 to the second port 1205. When closing the valve, as shown in FIG. 14, the coil may be activated causing the piston 1215 to travel toward the port 1201 (e.g., in an upward direction, as illustrated by arrows 1210) against the spring force of the spring 1230. FIG. 15 illustrates the closed state, where the restriction member 1216 blocks the opening 1202 and cuts of the suction pressure to the second flow segment 1203*b*. When opening the valve, referring to FIG. 16, the suction pressure may be deactivated. In addition or alternatively, the current in the coil 1220 may be inverted or deactivated. Without force from the suction pressure and/or the coil 1220 holding the piston 1215 upward in the closed position, the piston 1215 may be allowed or prompted to travel downward under the spring force and/or a downward force exerted by the coil 1220. The present disclosure is not limited to a particular combination of valve types. A sub-combination of the features herein are possible. For example, the plurality of suction cups 160 (in FIGS. 3-5) may include one type of valves. In some embodiments, the plurality of suction cups 160 may include a combination or a sub-combination of valves discussed herein. For example, the plurality of suction cups 160 may include a first valve type (e.g., the valve 60), a second valve type (e.g., the valve 80), and/or a third valve (e.g., the valve 1200). As discussed herein, the first valve type may include the first piston 610 configured to receive a positive pressure at the positive pressure receiving port 615 to drive the restriction member 611 away from the orifice 603 to open the flow path 602 while closing the path through the discharge port 606 that opens to atmosphere. The second valve type may include the second piston 815 configured to receive a positive pressure at the positive pressure receiving port 814 to drive the restriction member 816 toward the orifice 802 along the flow path 803. The third valve type 1200 may include the third piston 1215 coupled to the spring 1230 and the electromagnetic coil 1220 configured to drive the restriction member 1216 toward the orifice 1202 by controlling an electric current in the coil 1220.

Figure 17:
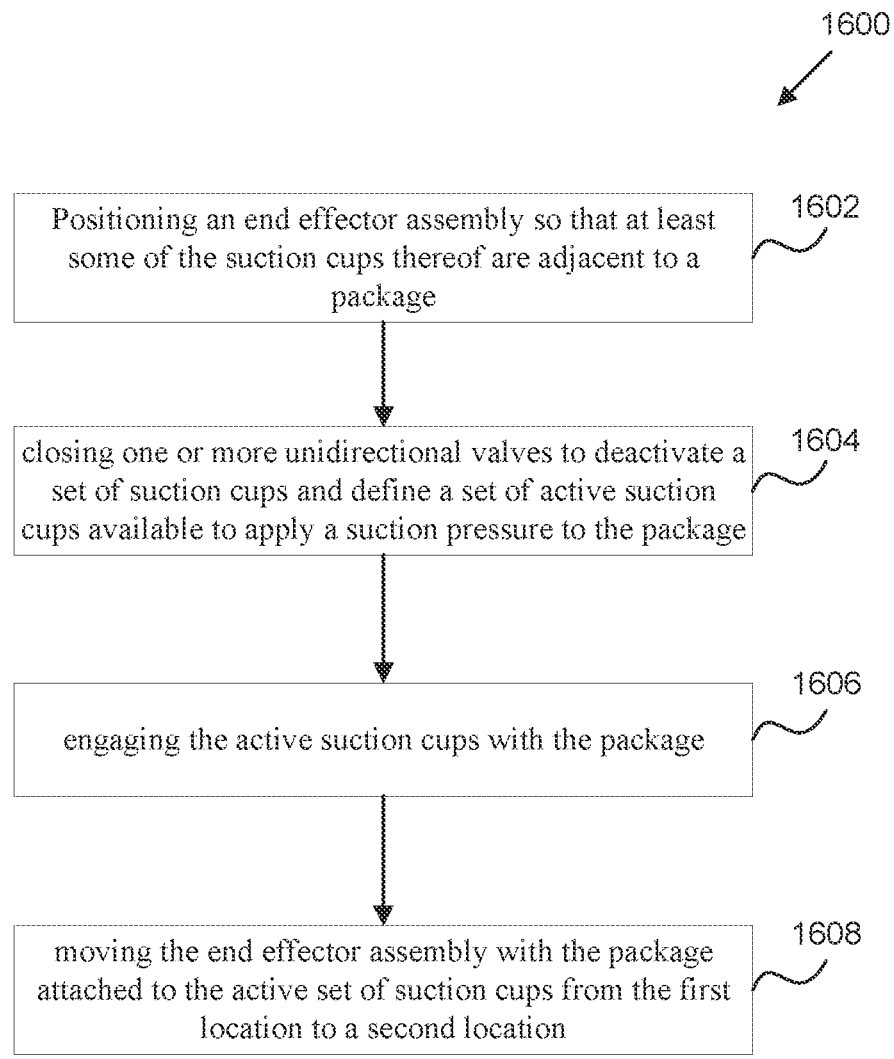
FIG. 17 is a flow chart of an example process for handling packages using an end effector employing a set of unidirectional valves in accordance with various embodiments.

FIG. 17 is a flow chart of an example process 1600 for moving items using an end effector assembly, according to some embodiments. As an alternative, the flowchart of FIG. 17 may be viewed as depicting an example of elements of a method implemented by one or more controllers 200 (FIG. 2) according to one or more embodiments. For example, the items 106 may be moved using the end effector assembly 103. As discussed herein, the end effector assembly 103 may include the plurality of suction cups 160 configured to individually receive suction pressure. The end effector assembly 103 may further include the set of unidirectional pneumatic valves 150 coupled to the plurality of suction cups 160 to individually control supply or cut-off of the suction pressure to an individual suction cup (e.g., 160*a*-160*q*) of the plurality of suction cups 160.

Some or all of the process 1600 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The process 1600 at block 1602 can include positioning (e.g., via the controller 200 or other controller), the end effector assembly (e.g., 103). The positioning can include positioning so that at least some of the suction cups (e.g., 160) of the end effector assembly are adjacent to an item at a first location. In some embodiments, the positioning can be achieved by the controller 200 instructing the robotic arm and/or the end effector assembly to move adjacent to the item (e.g., 106), such as in contact with the suction cups (e.g., 160) or close enough to the suction cups (e.g., 160) that the suction cups can apply suitable suction to draw the item into engagement with the suction cups.

The process 1600 at block 1604 can include closing one or more unidirectional valves (e.g., 150, 60, 80, 1200). In some embodiments, the closing may be achieved, via the controller (e.g., the controller 200 or particularly the end effector application 210 in the controller 200 shown in FIGS. 2 and 17) configured to control the positive pressure source (e.g., 230) and/or the vacuum pressure source (e.g., 220). In some embodiments, the closing may be based on the size of the item. In some embodiments, the closing involves deactivating a set of suction cups (e.g., suction cups 160a and 160p in FIGS. 3-5). Deactivating the set of suction cups can also define a set of active suction cups (e.g., remaining suction cups of 160 other than 160a and 160p) available to apply a suction pressure to the item. For example, the deactivated suction cups may correspond to item locations having a label, suction-sensitive material that may be damaged, an area outside the package, or other selected locations. In some embodiments, closing the one or more unidirectional valves (e.g., 150, 60, 80, 1200) and deactivating the set of suction cups (e.g., suction cups 160a and 160p) may prevent sucking in atmosphere through the deactivated set of suction cups or leaking vacuum to atmosphere. Such prevention may allow the suction pressure to be redistributed to the active suction cups to effectively utilize the suction pressure for engaging the item 106. In some cases, without such prevention, the leaking of the suction pressure or sucking in atmospheric pressure may reduce the suction pressure at the active suction cup sets (e.g., remaining suction cups of 160 other than 160a and 160q), which may detrimentally cause an item (e.g., 106) to be dropped at an undesired time or location or to be unable to be lifted at all by the system.

The process 1600 at block 1606 can include engaging the active suction cups (e.g., remaining suction cups of 160 other than 160a and 160q) with the item (e.g., 106). In some embodiments, the active suction cups (e.g., remaining suction cups of 160 other than 160a and 160q) may be engaged by the controller (e.g., 200) manipulating the robotic arm (e.g., 102) and/or the end effector assembly (e.g., 103) so that the suction cups are in contact with the item (e.g., 106) or close enough to the item (e.g., 106) to engage the item with the active suction cups (e.g., remaining suction cups of 160 other than 160a and 160q) by the suction pressure.

The process 1600 at block 1608 can include moving the end effector assembly (e.g., 103) with the item (e.g., 106) attached to the active set of suction cups (e.g., remaining suction cups of 160 other than 160a and 160q) from the first location to a second location. At the second location, the item (e.g., 106) may be dropped by deactivating some or all the suction cups 160. In some embodiments, the moving may be achieved via the controller (e.g., 200 shown in FIGS. 2 and 17) configured to manipulate a robotic arm (e.g., 102) and/or the end effector assembly (e.g., 103) attached to the robotic arm (e.g., 102). For example, the controller 200 may manipulate the robotic arm 102 or the end effector assembly 103 to move the item 106 at the first location to the second location. At the second location, the controller 200 can instruct the vacuum source 220 to remove the suction pressure to deactivate the suction cups so that the item 106 may be placed/dropped at the second location.

Figure 18:
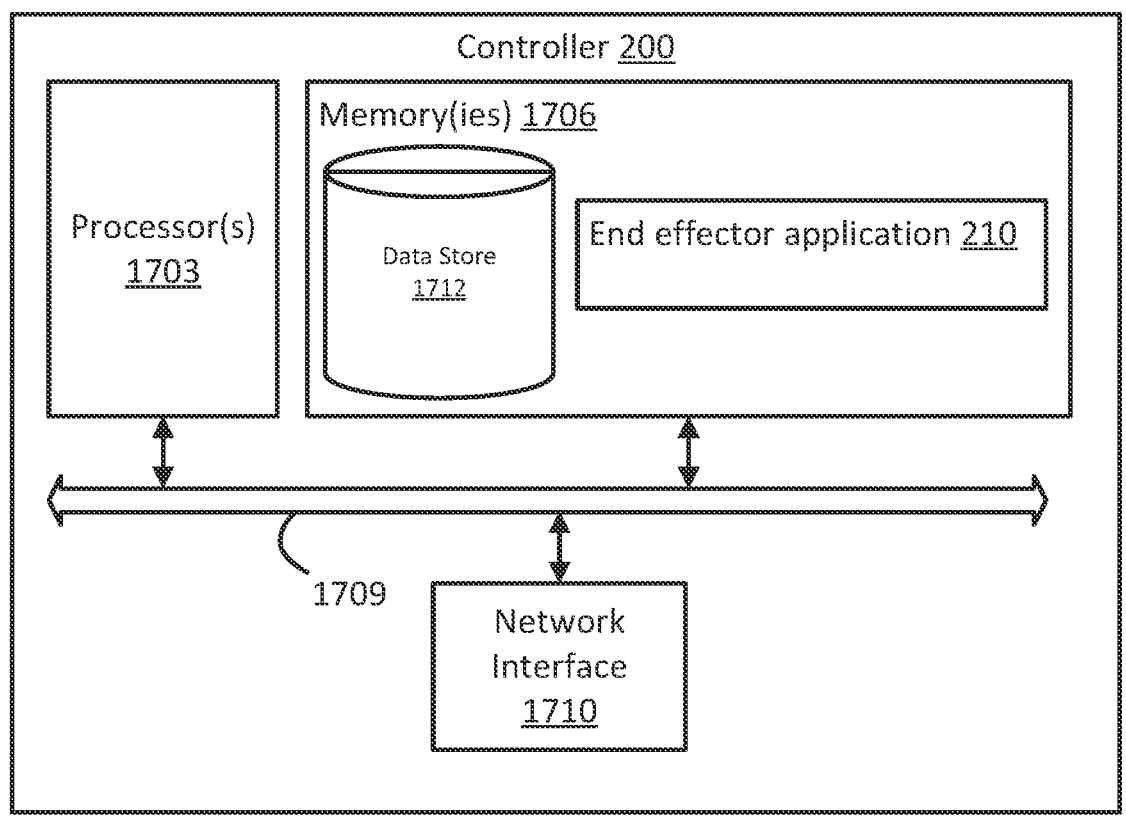
FIG. 18 is a block diagram of a controller in accordance with various embodiments.

FIG. 18 is a schematic block diagram of the controller 200, according to some embodiments. The controller 200 may include one or more computing devices. The controller 200 includes at least one processor circuit, for example, having a processor 1703 and a memory 1706, both of which are coupled to a local interface 1709. The local interface 1709 may comprise, for example, a data bus with an accompanying address/control bus or other bus structure as can be appreciated. The controller 200 may also include a network interface 1710 for data communications with the various components of the present disclosure of embodiments and for data communication with other remote computing devices.

Stored in the memory 1706 are both data and several components that are executable by the processor 1703. In particular, stored in the memory 1706 and executable by the processor 1703 is the end effector application 210, and potentially other applications. Also stored in the memory 1706 may be a data store 1712 and other data. In addition, an operating system may be stored in the memory 1706 and executable by the processor 1703.

It is understood that there may be other applications that are stored in the memory 1706 and are executable by the processor 1703 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 1706 and are executable by the processor 1703. In this respect, the term "executable" means a program file that is in a form that can ultimately be run by the processor 1703. Examples of executable programs may be, for example, a compiled program that can be translated into machine code in a format that can be loaded into a random access portion of the memory 1706 and run by the processor 1703, source code that may be expressed in proper format such as object code that is capable of being loaded into a random access portion of the memory 1706 and executed by the processor 1703, or source code that may be interpreted by another executable program to generate instructions in a random access portion of the memory 1706 to be executed by the processor 1703, etc. An executable program may be stored in any portion or component of the memory 1706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 1706 is defined herein as including both volatile and nonvolatile memory and data storage components. Volatile components are those that do not retain data values upon loss of power. Nonvolatile components are those that retain data upon a loss of power. Thus, the memory 1706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1703 may represent multiple processors 1703 and/or multiple processor cores and the memory 1706 may represent multiple memories 1706 that operate in parallel processing circuits, respectively. In such a case, the local interface 1709 may be an appropriate network that facilitates communication between any two of the multiple processors 1703, between any processor 1703 and any of the memories 1706, or between any two of the memories 1706, etc. The local interface 1709 may comprise additional systems designed to coordinate this communication, including, for example, performing load balancing. The processor 1703 may be of electrical or of some other available construction.

Although the end effector application 210 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 17 shows the functionality and operation of an implementation of portions of the application. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 1703 in a computer system or other system. The machine code may be converted from the source code, etc. If embodied in hardware, each block may represent a circuit or a number of interconnected circuits to implement the specified logical function(s).

Although the flowchart of FIG. 17 shows a specific order of execution, it is understood that the order of execution may differ from that which is depicted. For example, the order of execution of two or more blocks may be scrambled relative to the order shown. Also, two or more blocks shown in succession in FIG. 18 may be executed concurrently or with partial concurrence. Further, in some embodiments, one or more of the blocks shown in FIG. 18 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including end effector application 210, that comprises software or code can be embodied in any non-transitory computer-readable medium for use by or in connection with an instruction execution system such as, for example, a processor 1703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including end effector application 210, may be implemented and structured in a variety of ways. For example, one or more applications described may be implemented as modules or components of a single application. Further, one or more applications described herein may be executed in shared or separate computing devices, controllers 200 or a combination thereof. For example, a plurality of the applications described herein may execute in the same controller 200, or in multiple controller 200 in the robotic system 100. Additionally, it is understood that terms such as "application," "service," "system," "engine," "module," and so on may be interchangeable and are not intended to be limiting.

Implementations of the disclosure can be described in view of a robotic system that includes following:
a robotic arm;
a vacuum source;
an end effector assembly coupled to a distal-most joint of the robotic arm, the end effector assembly comprising:
a hub comprising branched flow conduits;
a plurality of suction cups extending from the hub, the branched flow conduits configured to convey suction pressure from the vacuum source along individual flow paths leading to each of the plurality of suction cups; and
a set of unidirectional pneumatic valves supported by the hub and individually configured to open or close the flow path to an individual suction cup of the plurality of suction cups; and
a controller configured to individually activate the set of unidirectional pneumatic valves for opening or closing the flow path to the individual suction cup.
each unidirectional pneumatic valve comprises a body including:
a first port to receive the suction pressure;
a second port to couple with a suction cup of the plurality of suction cups, a flow path extending between the first port and the second port; and
a movable piston to open or close the flow path.
wherein the flow path comprises an orifice, and the piston comprises a restriction member (e.g., a ball) sized to block the orifice at one end and
wherein a pneumatic pressure receiving port at other end to drive the restriction member (e.g., the ball) of the piston toward the orifice.

Wherein the controller is configured to control, based on a selected suction cup to be deactivated, a pneumatic pressure to a piston of a unidirectional pneumatic valve coupled to the selected suction cup.

Wherein the piston is spring loaded and coupled to an electro-magnet, wherein a movement of the piston is controlled by controlling an electric current to a coil of the electro-magnet.

Wherein the controller is configured to control, based on a desired suction cup to be deactivated, an electric current to the coil of the electro-magnet driving a piston of a unidirectional pneumatic valve coupled to the desired suction cup.

the piston is disposed at an angle to the flow path.

the angle of the piston is an acute angle with respect to a direction extending toward a suction cup of the plurality of suction cups coupled to the second piston.

the piston is driven partially into the flow path causing the piston to be sucked into the flow path by the suction pressure thereby closing the flow path and cutting-off the suction pressure to the respective suction cup.

the piston is driven by a pneumatic pressure, wherein when the pneumatic pressure is removed, the piston is retracted, and the flow path of the respective suction cup is opened.

Implementations of the disclosure can be described in view of an end effector assembly that includes following:

a plurality of suction cups configured to individually receive suction pressure; and a set of unidirectional pneumatic valves coupled to the plurality of suction cups to individually control supply or cut-off of the suction pressure to an individual suction cup of the plurality of suction cups.

The plurality of suction cups receive the suction pressure from a shared suction source (e.g. through branched flow conduit)

The assembly further includes a hub (or other element to attach at the end of the end effector so mount the valves are on it and not on further away joints on the robotic arm)

each unidirectional pneumatic valve are open in a ready or default state, and selectively closeable based on a selected suction cup of the plurality of the suction cups to be deactivated.

valve held closed by suction pressure when closed and returns to open state upon cessation of suction pressure each unidirectional pneumatic valve comprises a body including:

a first port to receive the suction pressure;

a second port to couple with a suction cup of the plurality of suction cups, a flow path extending between the first port and the second port; and a movable piston to open or close the flow path.

the piston comprises a ball sized to block the flow path to the respective suction cup, wherein the piston is pneumatically actuated.

wherein the piston is spring loaded and electro-magnetically actuated.

the piston is disposed at an angle to the flow path and partially driven into the flow path by a pneumatic pressure causing the piston to be sucked into the flow path by the suction pressure thereby closing the flow path and cutting-off the suction pressure to the respective suction cup.

the piston is configured to be retracted upon removing the pneumatic to the flow path to the respective suction cup.

Based on the disclosure and teachings provided herein, a person of ordinary skill in the art will appreciate other ways and/or methods to implement the various embodiments. The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A robotic system, comprising:
    a robotic arm;
    a vacuum source;
    an end effector assembly coupled to a distal-most joint of the robotic arm, the end effector assembly comprising:
        a hub comprising branched flow conduits;
        a plurality of suction cups extending from the hub, the branched flow conduits configured to convey suction pressure from the vacuum source along individual flow paths leading to each of the plurality of suction cups; and
        a set of unidirectional pneumatic valves supported by the hub and individually configured to open or close the flow path to an individual suction cup of the plurality of suction cups, each of the unidirectional pneumatic valves comprising a movable piston configured to move independently with respect to the individual suction cup to facilitate opening and closing of the flow path; and
    a controller configured to individually activate the set of unidirectional pneumatic valves for opening or closing the flow path to the individual suction cup.

2. The robotic system of claim 1, wherein each unidirectional pneumatic valve comprises a body including:
    a first port to receive the suction pressure;
    a second port to couple with a suction cup of the plurality of suction cups;
    a flow path extending between the first port and the second port, the flow path comprising an orifice; and
    the movable piston to open or close the orifice along the flow path.

3. The robotic system of claim 2, wherein the movable piston comprises a restriction member to block the orifice at one end; and the other end is coupled to a positive pressure receiving port to receive a positive pressure for driving the restriction member.

4. The robotic system of claim 3, wherein each of the set of unidirectional pneumatic valve comprises at least one of:
    a first valve type comprising a first piston configured to receive the positive pressure at the positive pressure receiving port to drive the restriction member away from the orifice to open the flow path, the first valve type further comprising a discharge port open to atmosphere, the first piston being the movable piston;
    a second valve type comprising a second piston configured to receive the positive pressure at the positive pressure receiving port to drive the restriction member toward the orifice along the flow path, the restriction member being further drivable by the suction pressure when entering the flow path, the second piston being the movable piston; or
    a third valve type comprising a third piston coupled to a spring and an electromagnetic coil and configured to drive the restriction member toward the orifice by controlling an electric current in the coil, the third piston being the movable piston.

5. The robotic system of claim 4, wherein the controller is configured to:
    control, based on a selected suction cup to be deactivated, a pneumatic pressure to the movable piston of a unidirectional pneumatic valve of the set of unidirectional pneumatic valves coupled to the selected suction cup; or
    control, based on a selected suction cup to be deactivated, an electric current to the coil driving the movable piston of a unidirectional pneumatic valve of the set of unidirectional pneumatic valves coupled to the selected suction cup.

6. An end effector assembly, comprising:
    a plurality of suction cups configured to individually receive suction pressure; and
    a set of unidirectional valves coupled to the plurality of suction cups to individually control supply or cut-off of the suction pressure to an individual suction cup of the plurality of suction cups, each of the unidirectional valves comprising a movable piston configured to move independently with respect to the individual suction cup to facilitate opening and closing of a flow path to the individual suction cup,
    wherein at least one unidirectional valve of the set of unidirectional valves is open in a ready or default state and selectively closeable based on a selected suction cup of the plurality of the suction cups to be deactivated.

7. The end effector assembly of claim 6, wherein the plurality of suction cups receive the suction pressure from a shared vacuum source.

8. The end effector assembly of claim 7, further comprises a hub configured to support the set of unidirectional valves, the hub including branched flow conduits to convey suction pressure from the vacuum source along individual flow paths leading to each of the plurality of suction cups.

9. The end effector assembly of claim 6, wherein each unidirectional valve of the set of unidirectional valves comprises a body including:
    a first port to receive the suction pressure;
    a second port to couple with a suction cup of the plurality of suction cups;
    a flow path extending between the first port and the second port, the flow path comprising an orifice; and
    the movable piston to open or close the orifice along the flow path.

10. The end effector assembly of claim 9, wherein the movable piston comprises a restriction member to block the orifice at one end; and the other end is coupled to a positive pressure receiving port to receive a positive pressure for driving the restriction member.

11. The end effector assembly of claim 10, wherein each of the set of unidirectional valves comprises:
    the movable piston configured to receive the positive pressure at the positive pressure receiving port to drive the restriction member away from the orifice to open the flow path; and
    a discharge port open to atmosphere.

12. The end effector assembly of claim 11, wherein each of the set of unidirectional valve comprises:
    a first flow path to convey the suction pressure from the first port to the second port; and
    a second flow path extending between the second port and the discharge port.

13. The end effector assembly of claim 12, wherein each of the set of unidirectional valves is configured to switch between the first flow path and the second flow path to activate or deactivate the individual suction cup of the plurality of suction cups.

14. The end effector assembly of claim 12, wherein each of the set of unidirectional valves is configured to receive a positive pressure to drive the restriction member away from the orifice to open the first flow path while closing the second flow path to activate the individual suction cup.

15. The end effector assembly of claim 14, further comprises: a pneumatic manifold comprising:
   an inlet port; and
   a plurality of outlet ports, the inlet port being configured to receive the positive pressure and each of plurality of outlet ports configured to direct the positive pressure to a particular unidirectional valve of the set of unidirectional valves.

16. The end effector assembly of claim 12, wherein upon removal of at least one of the positive pressure or the suction pressure, the movable piston is configured to drive the restriction member toward the orifice to close the first flow path while opening the second flow path so as to deactivate the individual suction cup.

17. The end effector assembly of claim 12, wherein the first flow path is longer in length compared to the second flow path.

18. A method of using an end effector assembly, the end effector assembly comprising a plurality of suction cups configured to individually receive suction pressure; and a set of unidirectional pneumatic valves coupled to the plurality of suction cups to individually control supply or cut-off of the suction pressure to an individual suction cup of the plurality of suction cups, each of the unidirectional pneumatic valves comprising a movable piston configured to move independently with respect to the individual suction cup to facilitate supply or cut-off of the suction pressure, the method comprising:
   positioning, via a controller, the end effector assembly so that at least some of the suction cups thereof are adjacent to an item at a first location;
   closing one or more unidirectional pneumatic valves, via the controller based on a size of the item, to deactivate a set of suction cups and define a set of active suction cups available to apply a suction pressure to the item;
   engaging the active suction cups with the item; and
   moving, via the controller, the end effector assembly with the item attached to the active set of suction cups from the first location to a second location.

19. The method of claim 18, wherein closing the one or more unidirectional pneumatic valves and deactivating the set of suction cups further comprises:
   preventing sucking in atmosphere through the deactivated set of suction cups or losing vacuum to atmosphere so that the suction pressure is redistributed to the active suction cups to effectively utilize the suction pressure for engaging the item.

* * * * *